Figure 1:
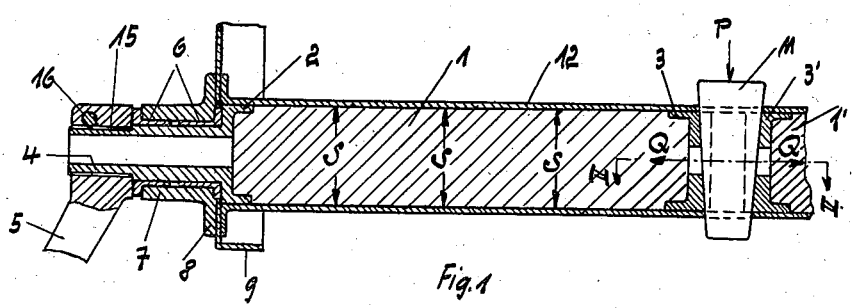

July 27, 1937.　　　　　K. RABE　　　　　2,088,340

SPRINGING ARRANGEMENT FOR MOTOR CARS AND THE LIKE

Filed July 26, 1934

Inventor:
Karl Rabe

Patented July 27, 1937

2,088,340

UNITED STATES PATENT OFFICE 2,088,340

SPRINGING ARRANGEMENT FOR MOTOR CARS AND THE LIKE

Karl Rabe, Stuttgart, Germany

Application July 26, 1934, Serial No. 737,099
In Germany July 13, 1933

27 Claims. (Cl. 267—21)

This invention relates to a springing arrangement for motor cars and the like.

Springing arrangements are already known, in which the link member or shafts which are journalled in the frame are engaged by steel bars which are torsionally stressed. For insuring the requisite specific wheel springing these spring bars must be made exceedingly thin. This makes it difficult to find room for the requisite length of bar in the frame. More particularly in the case of spring bars which are disposed transversely in the frame it is as a rule impossible to adapt the requisite length of bar to the available width of frame. In this case it becomes necessary, to increase the length of the link member, which results in an undue increase in the unsprung masses. A further disadvantage of this manner of springing is that it is completely undamped, as steel has no self damping property. In order to give this springing the properties required in practical operation, special shock absorbers must be provided, the mounting of which is very inconvenient and costly. The object of the invention is to overcome these disadvantages.

The invention contemplates that the journals or shafts of the link members, which are journalled in the frame, engage rubber bars which are stressed in torsion or shear. Such rubber bars are stouter, that is to say, they have a smaller length as compared with the steel bars. On the other hand, however, they have a greater diameter and, therefore, adapt themselves more readily to the given space conditions. For this reason it is possible to house the rubber bars within the frame, even in the case of high specific wheel springing motions, so that there is complete freedom in designing the lengths of the link members. The vibration strength of the rubber bars is greater than that of the steel bars, without any danger of their settling when in operation. Furthermore the specific weight of the rubber bars is lower, as through the particular way in which they are fixed a dead spring volume can be avoided. The breaking of a spring practically never occurs. As rubber has a high coefficient of damping, the additional provision of shock absorbers becomes unnecessary. The damping energy absorbed by the rubber bars can thus, owing to the great bar surface, be transmitted directly to the frame in the form of heat. The damping energy itself can be regulated in a suitable manner by simple means, for instance, by frictional contact between the free bar surface and the frame. The properties governing springs are in this case more favourable, as the power of the spring increases progressively with respect to the path of the spring. By an additional initial stressing of the rubber bar in tension or compression these properties can also be regulated in any desired manner.

Springing arrangements employing rubber bodies stressed in shear are already known. In these arrangements, however, the link members are not rigidly mounted in the frame but are embedded in the rubber bodies themselves. The link members are therefore, not only sprung by these rubber bodies, but are also supported by them, so that the rubber bodies are stressed not only in shear but also in tension and compression. Through the mobility in all directions of the link member ends in the rubber bodies it is as a rule impossible to obtain a guiding of the wheel with one possibility of motion with respect to the frame. Attempts have been made, it is true, to reduce this mobility in all directions by mounting the rubber bodies in the frame with a considerable initial stressing in compression. This, however, reduces the absorbing capacity of the rubber, with the result that greater spring volumes must be used for obtaining the high specific springing required for independent wheels. As, however, these rubber bodies have in the latter case to absorb the bearing forces as well as the returning forces, they are far more liable to fatigue and have, therefore, to be changed after being in operation only for a short time.

Two constructional examples of the arrangement according to the invention are shown in the accompanying drawing, in each case as applied to the left front wheel of a motor vehicle.

Fig. 1 is a horizontal main section through the springing arrangement.

Figure 2:
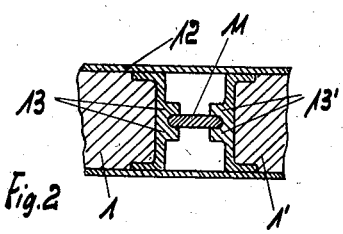

Fig. 2 a section on line II—II of Fig. 1.

Figure 3:
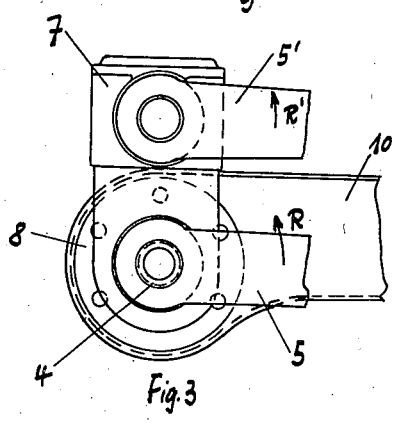

Fig. 3 is a partial side elevation of a spring arrangement embodying the present invention.

Figure 4:
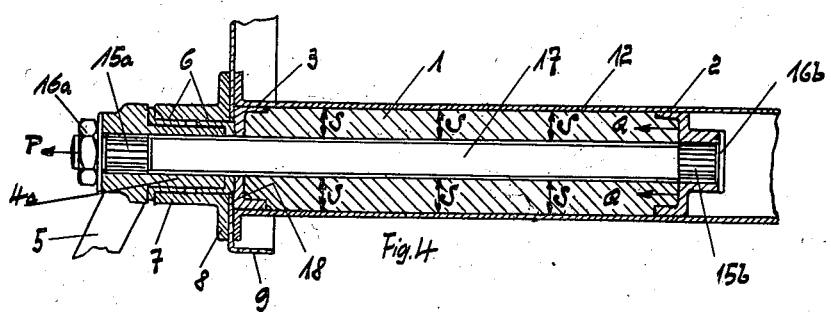

Fig. 4 a horizontal main section through a second constructional form.

In the constructional example shown in Figs. 1 to 3 the cylindrical rubber bar 1 is connected rigidly to socket-like members 2, 3 which may be, for example, vulcanized to its ends. One end member 2 of the rubber bar 1 is directly connected to the link member journal 4. The link member journal 4 is journalled in the casing member 7 with interposed bushes 6. The casing member 7 is fixed by suitable means such as the flange 8 to the widened end 9 of a longitudinal frame member 10. The other end member 3 of the rubber bar 1 is, for example, together with a similar end member 3' of rubber bar 1' which lies co-axially opposite the rubber bar 1 and is disposed symmetrically to the longitudinal central plane of the vehicle secured against turning by means such as an adjustable key 11 in a hollow transverse member 12 of the frame. The hollow transverse member 12 is interposed between the longitudinal frame members 10, and at the same time serves the purpose of stiffening the frame. The rubber bars 1, 1' are enclosed in the hollow transverse member 12, which thus also acts as the spring container. The end members 2, 3 are mounted directly in the hollow transverse member 12. The adjacent end members 3, 3' are provided with projections 13, 13' in which the adjustable key 11 engages. On the adjustable key 11 being driven forwards in the direction of the arrow P the end members 3, 3' are driven apart in the direction of the arrows Q, Q'. By this means the cylindrical surface of the rubber bars 1, 1' are pressed against the wall of the hollow transverse member 12 in the direction of the arrows S. The link member journal 4 is connected to the link member 5 by a corrugated surface 15 and secured with respect to the latter by a pin 16. In the casing member 7 a second link 5' is mounted above and parallel to the former. To the ends of the link members 5, 5' the steering swivel carrier (not shown) may be pivotally attached.

When driving over an obstacle the link members 5, 5' swing in the same sense in the direction of the arrows R, R', the torque being transmitted from the lower link member 5 to the link member journal 4 and from the latter through the end member 2 to the rubber bar 1 which is thereby stressed in torsion. Through the twisting of the rubber bar 1 a returning moment is produced which periodically forces the link members 5, 5' to swing back again. These swinging motions die away rapidly for two reasons. In the first place, the rubber bar 1 has a relatively high self-damping effect, in consequence of which the springing energy absorbed in each case cannot be completely restored. Secondly the rubber bar 1 is in frictional contact with the hollow transverse member 12 owing to the pressure S with which it is pressed against it, so that there is added to the self-damping effect a frictional damping effect. The frictional energy decreases in accordance with the magnitude of the frictional path from the end member 2 with respect to the end member 3, and can be adjusted at will by increasing the pressing pressure S which is regulable by means of the adjustable key 11. Through the permanent contact between the rubber bar 1 along its cylindrical surface and the hollow transverse member 12 the liberated damping energy flows in the form of heat into the frame.

In the constructional example, according to Fig. 4 the hollow cylindrical rubber bar 1 is also rigidly connected at its end surfaces to socket-like members 2, 3. The rubber bar 1 and its end members 2, 3 are pierced axially by a link member shaft 17. The outer end of the link member shaft 17 is secured to the link member journal 4a by suitable means such as a splined connection 15b and by a nut 16a. The inner end of the link member shaft 17 may be connected to the end member 2 by a splined connection 15b and by a collar 16b so as to prevent longitudinal displacement. The end member 3 of the rubber bar 1 is secured with respect to the casing 7 by claws 18.

On the link member 5 swinging upwards, the torque is transmitted through the link member shaft 17 to the end member 2 and the rubber bar 1 is twisted from its inner end. The link member shaft 17 need not be rigid but may be an elastic steel bar which will twist itself. The frictional damping is effected by axially initially stressing the rubber bar 1 by means of the nut 16a in the direction of the arrow P, whereby the end member 2 compresses the rubber bar 1 in the direction of the arrow Q. The external cylindrical surface of the rubber bar 1 is thereby pressed against the wall of the hollow transverse member 12 and/or the inner cylindrical surface against the link member shaft 17 in the sense of the arrow S. In the latter case the frictional energy is distributed approximately evenly over the whole length of the bar, so that the frictional damping effect is correspondingly increased.

The invention is, of course, not restricted to these constructional examples. The link member 5 may be mounted in any suitable manner in the casing member 7, as long as the wheel remains guided with one direction of motion with respect to the frame. Whether the wheel is supported by a single link member or a pair of link members forming a parallel motion arrangement is immaterial as regards the nature of the invention. It is also immaterial whether the wheel swings in the direction of travel or at right-angles thereto, provided it is guided independently with respect to the frame. In place of rubber any other elastic material may be employed in so far as it is capable of being stressed and fixed in the same way as rubber. The rubber bar may also be totally enclosed in a separate casing, that is, independently of the frame members, for instance, may be enclosed directly in the casing member 7.

The word "frame" as herein used is not to be understood as limited to such devices when formed separate from the body or coachwork of the vehicle but as including such devices when forming a part of or intimately interconnected with said body or coachwork of the vehicle.

The invention is not intended to be limited to the two forms shown, which are to be understood as illustrative only and not as limiting, as various changes in construction and arrangement may be made, all coming within the scope of the claims which follow.

What I claim is:

1. In a vehicle, a frame, a road wheel, spring mechanism for supporting said road wheel relative to said frame comprising an elongated torsion bar of rubber-like material, abutment means carried by the vehicle and attached to one end of said rubber bar to prevent rotation thereof and a rotatable spring reaction transmitting means attached to the other end of said bar.

2. A springing arrangement according to claim 1 in which means are provided intermediate the ends of the bar for supporting said bar against transverse movement.

3. A springing arrangement according to claim 1 in which means are provided intermediate the ends of the bar for supporting said bar against transverse movement, said supporting means being cylindrical and extending substantially the entire length of the bar.

4. A springing arrangement according to claim 1 in which means are provided intermediate the ends of the bar for supporting said bar against transverse movement, said supporting means comprising a tube surrounding said bar.

5. A springing arrangement according to claim 1 in which means are provided intermediate the ends of the bar for supporting said bar against transverse movement, said supporting means comprising a tube tightly enclosing said bar.

6. A springing arrangement according to claim 1 in which means are provided intermediate the ends of the bar for supporting said bar against transverse movement, said supporting means comprising a tube tightly enclosing said bar and means for precompressing said bar axially.

7. A springing arrangement according to claim 1 in which means are provided intermediate the ends of the bar for supporting said bar against transverse movement, said supporting means comprising a tube tightly enclosing said bar, said abutment means comprising means for precompressing said bar axially.

8. A springing arrangement according to claim 1 in which means are provided for precompressing said bar.

9. A springing arrangement according to claim 1 in which means are provided for precompressing said bar, said precompressing means comprising a part of said abutment means.

10. A springing arrangement according to claim 1 in which means are provided intermediate the ends of the bar for supporting said bar against transverse movement, said supporting means comprising a rod extending through said rubber bar.

11. A springing arrangement according to claim 1 in which means are provided intermediate the ends of the bar for supporting said bar against transverse movement, said supporting means comprising resilient torsion means.

12. A springing arrangement according to claim 1 in which means are provided intermediate the ends of the bar for supporting said bar against transverse movement, said supporting means comprising a rod extending through said rubber bar, one end of said rod being connected to said rubber bar and the other end to means for supporting the road wheel.

13. A springing arrangement according to claim 1 in which means are provided intermediate the ends of the bar for supporting said bar against transverse movement, said supporting means comprising a rod extending through said rubber bar, one end of said rod being connected to said rubber bar and the other end to means for supporting the road wheel, said rod comprising a resilient torsion bar.

14. A springing arrangement according to claim 1 in which means are provided intermediate the ends of the bar for supporting said bar against transverse movement, said supporting means comprising a tube surrounding said bar and a cylindrical member extending through said rubber bar.

15. A springing arrangement according to claim 1 in which means are provided intermediate the ends of the bar for supporting said bar against transverse movement, said supporting means comprising a tube surrounding said bar and a resilient torsion bar extending through said rubber bar.

16. In a vehicle, a frame, a road wheel, spring mechanism for supporting said road wheel relative to said frame comprising an elongated torsion bar of rubber-like material, abutment means carried by the vehicle and vulcanized to one end of said rubber bar to prevent rotation thereof and a rotatable spring reaction transmitting means vulcanized to the other end of said bar.

17. A springing arrangement in accordance with claim 1 in which a tubular container is provided around the rubber bar contacting the bar along its entire outer longitudinal surface.

18. A springing arrangement in accordance with claim 1 in which a tubular container is provided around the rubber bar contacting the bar along its cylindrical surface, and in which an end member is provided which initially stresses the rubber bar in the axial direction and presses the bar against the container walls.

19. A springing arrangement in accordance with claim 1 in which a tubular container is provided around the rubber bar contacting the bar along its cylindrical surface, and in which end members are provided on the ends of the rubber bar which are journaled directly in the tubular container.

20. A springing arrangement according to claim 1 in which means are provided for precompressing said bar, and a single means for precompressing said bar and preventing rotation of said abutment.

21. A springing arrangement according to claim 1 in which means are provided intermediate the ends of the bar for supporting said bar against transverse movement, said supporting means comprising a tube surrounding said bar which tube comprises a tie member for said frame.

22. In a vehicle, a frame, a road wheel, spring mechanism for supporting said road wheel relative to said frame comprising a tubular torsion bar of rubber-like material and a second torsion bar having one of its ends attached to one end of the tubular torsion bar.

23. A springing arrangement according to claim 22 in which the second torsion bar is located within the tubular torsion bar.

24. A springing arrangement according to claim 22 in which the attaching means between the two torsion bars is so constructed and arranged as to provide for rotary adjustment.

25. A springing arrangement according to claim 1 in which the means for attaching the rubber torsion bar to the rotatable spring reaction transmitting means is so constructed and arranged as to provide for rotary adjustment.

26. A springing arrangement according to claim 1 in which the means for attaching the rubber torsion bar to the rotatable spring reaction transmitting means comprises a rotarily adjustable spline connection.

27. In a springing arrangement for vehicles having a frame, in combination, an elastic bar mounted within and frictionally engaging a portion of said frame, wheel supporting means attached to one end of said bar, and means for varying the frictional engagement between said bar and said frame.

KARL RABE.